[12] United States Patent
Jeong

(10) Patent No.: US 6,655,562 B2
(45) Date of Patent: Dec. 2, 2003

(54) HITCH-MOUNTED PIVOTABLE RACKING ASSEMBLY

(75) Inventor: Chanyoung Jeong, Cerritos, CA (US)

(73) Assignee: Vigor Sports, Cerritos, CA (US)

( * ) Notice: Subject to any disclaimer, the term of this patent is extended or adjusted under 35 U.S.C. 154(b) by 230 days.

(21) Appl. No.: 09/960,854

(22) Filed: Sep. 21, 2001

(65) Prior Publication Data

US 2002/0050502 A1 May 2, 2002

Related U.S. Application Data

(60) Provisional application No. 60/234,536, filed on Sep. 22, 2000.

(51) Int. Cl.[7] .................................................. B60R 9/08
(52) U.S. Cl. ........................ 224/282; 224/502; 224/505; 224/506; 224/521; 224/924
(58) Field of Search ................................ 224/504–506, 224/519, 521, 924, 282, 502, 503, 531, 532, 553, 310

(56) References Cited

U.S. PATENT DOCUMENTS

| 5,181,822 A | * | 1/1993 | Allsop et al. ................ 224/521 |
| 5,303,857 A | * | 4/1994 | Hewson ....................... 224/282 |
| 5,658,119 A | * | 8/1997 | Allsop et al. ................ 224/924 |
| 5,685,686 A | * | 11/1997 | Burns .......................... 224/521 |
| 5,730,345 A | * | 3/1998 | Yeckley et al. ............. 224/521 |
| 6,039,228 A | * | 3/2000 | Stein et al. ................. 224/521 |

* cited by examiner

Primary Examiner—Nathan J. Newhouse
(74) Attorney, Agent, or Firm—Oppenheimer Wolff & donnelly LLP

(57) ABSTRACT

A racking assembly for securely storing and transporting recreational equipment on vehicles includes a hitch mount, an equipment support assembly, and pair of support members having lower ends pivotally coupled to the hitch mount and upper ends pivotally coupled to the equipment support assembly. The support members are configured to allow the racking assembly to collapse away from a user placing equipment thereon so that injury is prevented from the weight of the equipment causing the racking assembly to collapse onto a user.

23 Claims, 4 Drawing Sheets

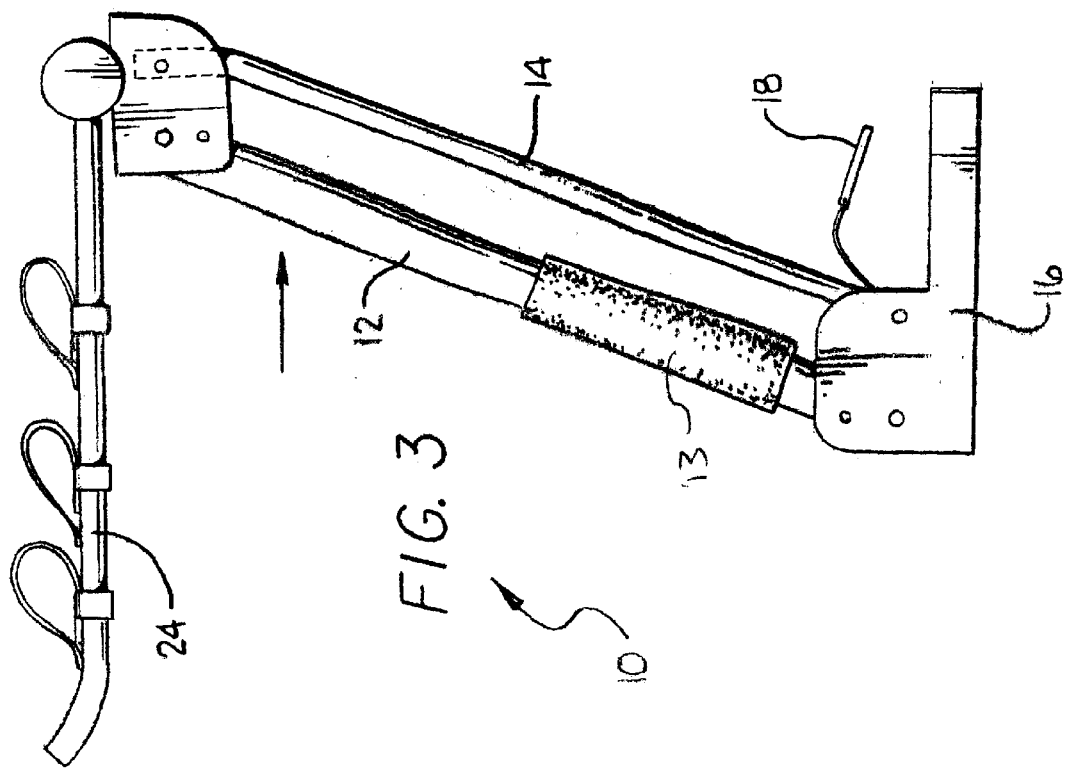
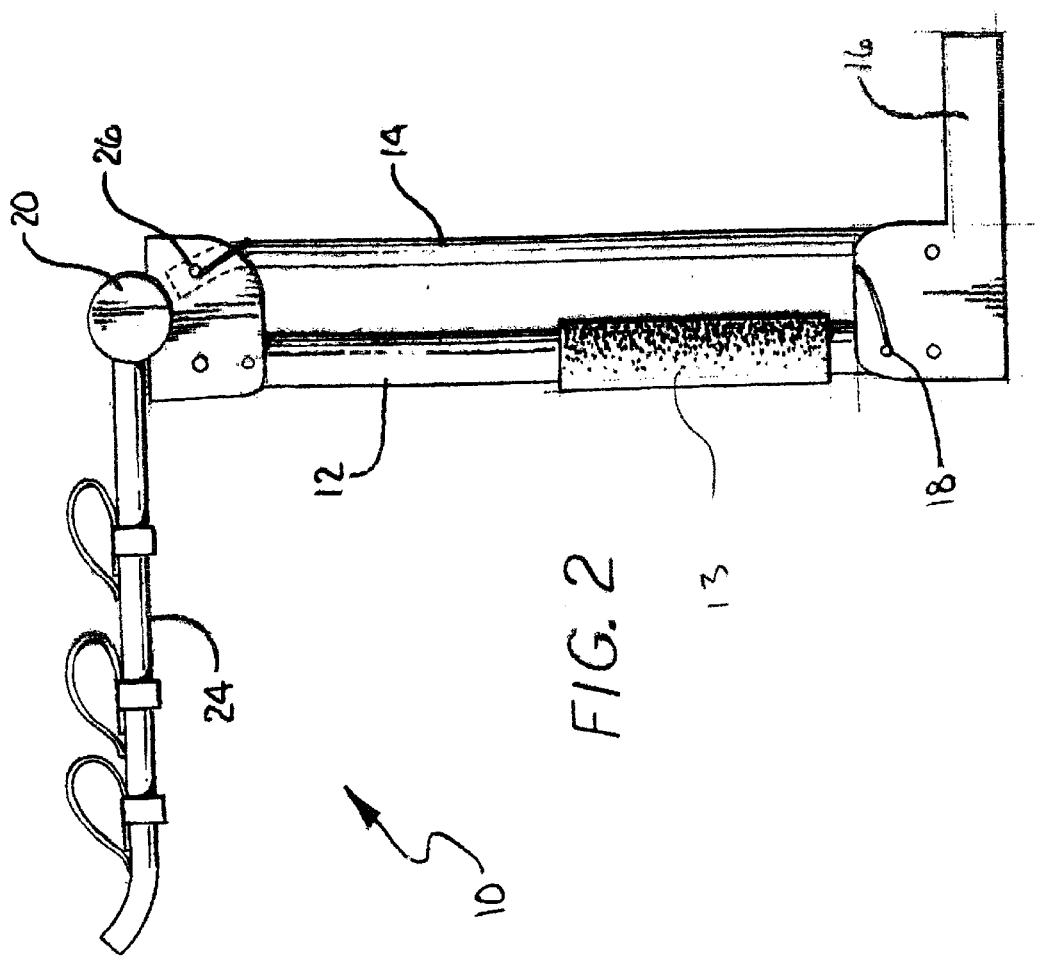

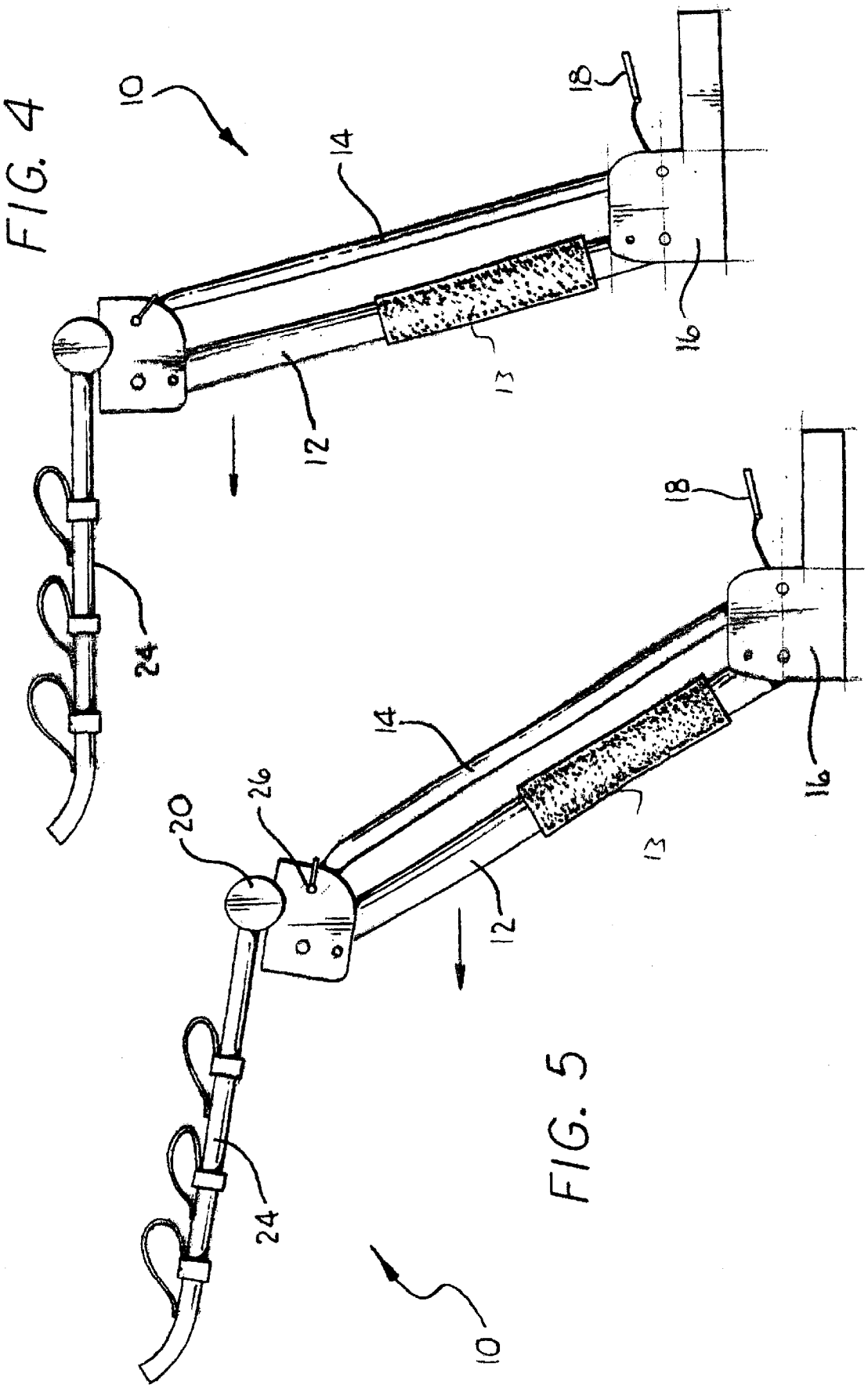

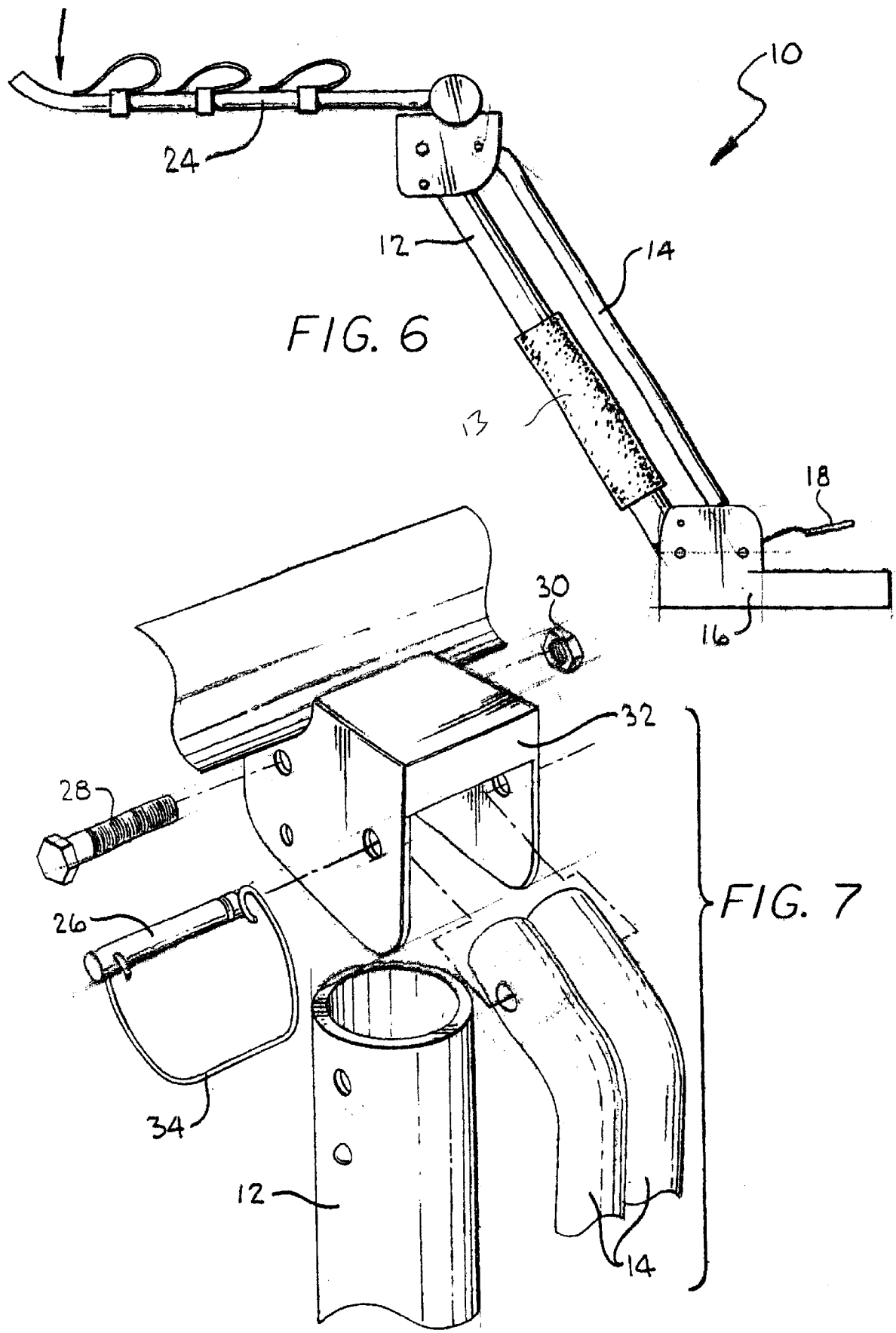

ially aligned. Each frame support member has an upper end and a lower end. The lower ends are pivotally coupled to a hitch member and the upper ends are pivotally coupled to an equipment support assembly. The assembly also includes a pair of pivoting mechanisms which allow movement of the racking assembly forward and backward. In one embodiment, the pair of frame support members are different sizes.
HITCH-MOUNTED PIVOTABLE RACKING ASSEMBLY

CROSS-REFERENCE TO RELATED APPLICATION

This application claims the benefit of U.S. Provisional Application No. 60/234,536 filed Sep. 22, 2000, whose entire contents are hereby incorporated by reference.

BACKGROUND OF THE INVENTION

1. Field of the Invention

The invention relates generally to racking assemblies. Specifically, the invention relates to racking assemblies capable of being mounted onto hitch attachments of vehicles to transport equipment, such as bicycles, skis and luggage.

2. General Background and State of the Art

There are many prior art racking assemblies capable of securely holding articles while being mounted on vehicles. Some prior art racking assemblies are capable of attaching to the rear of vehicles having a hitch. These prior art racking assemblies are placed on vehicles by positioning the racking assembly onto the hitch and locking the racking assembly in place using a pin. When the pin is in place, the racking assembly cannot move forward or backward relative to the vehicle, thereby providing a secure assembly for transporting a variety of articles. However, as the vehicle moves, unstable movement of the racking assembly may occur. Movement of the vehicle, especially at high speeds, may cause the racking assembly to vibrate. In such a situation, the articles placed on the racking assembly can loosen and may fall off while the vehicle is in motion. This can cause injury to other drivers by creating a potential road hazard. Also, attempting to remove loosened articles from the racking assembly after a vehicle has stopped may also cause injury. Therefore there is a need for a racking assembly which does not fall forward into a user when in an unlocked position while an article is being placed onto the racking assembly. There is also a need in the art for a racking assembly capable of attaching to a vehicle provide for stable support while the vehicle is in motion One prior art pivoting vehicle rack, found in U.S. Pat. No. 6,123,498, includes a hitch connector, an upright support, an equipment carrier and a lower plate. This rack is positionable on the hitch of a vehicle and supports equipment placed on the equipment carrier. One problem associated with this type of rack, and with other similar racks, is the operation of the rack when equipment is placed onto the equipment carrier. For example, when equipment or other weight is placed on the carrier, the rack has a tendency to fall forward toward the person placing the equipment on the rack. Therefore there is a need in the art for a racking assembly that does not fall toward a person loading equipment onto the racking assembly for transportation or storage.

INVENTION SUMMARY

The present invention provides a pivotable racking assembly capable of coupling to a vehicle's hitch mount for transporting equipment. The racking assembly includes a pair of frame support members that are generally parallel and longitudinally aligned. Each frame support member has an upper end and a lower end. The lower ends are pivotally coupled to a hitch member and the upper ends are pivotally coupled to an equipment support assembly. The assembly also includes a pair of pivoting mechanisms which allow movement of the racking assembly forward and backward. In one embodiment, the pair of frame support members are different sizes.

In one embodiment, the upper end of one of the frame support members curves inward toward the upper end of the other frame support member near the equipment support assembly. This results in the spacing between the ends of the frame support members being greater at the hitch mount than at the equipment support assembly. That is, the frame support members are positioned more closely together at the equipment support assembly than at the hitch mount. This configuration allows the pivotable racking assembly to collapse backward away from a person as equipment is placed on top of the equipment support assembly. When the racking assembly is mounted on the rear of a car, for example, this difference permits the racking assembly to rotate backward toward the vehicle when weight is applied to the racking assembly.

The configuration of the upper ends of the frame support members allows a person to safely place equipment onto the racking assembly without the possibility of accidentally collapsing the racking assembly toward himself or herself. As equipment is placed onto the equipment support bars connected to the equipment support assembly, the weight of the equipment forces the frame support members to pivot relative to the hitch member and equipment support assembly such that the racking assembly falls backward away from the user. As a force is applied to the equipment support bars, the force is transferred to the frame support members by the curvature of the upper end of one of the frame support members and the smaller difference in distance between the two frame support members at the upper ends than at the lower ends. The racking assembly pivots around a locking pin coupling the curved frame support member to the equipment support assembly, and the applied force is distributed between the longitudinal axis of the second frame support member and the pivot point of the first frame support member. This causes the frame support members to pivot away from the application of the force, and therefore it is the curvature of the upper end of the frame support that causes the racking assembly to collapse backwards away from a user standing adjacent to the equipment support bars.

In another embodiment, the second frame support member includes a pair of tubes of the same length and curvature welded together. This configuration provides additional security for the entire racking assembly and more support for items place on the equipment support assembly.

Accordingly, one object of the present invention is to provide a racking assembly that falls away from a person loading equipment onto the racking assembly. It is another object of the present invention to provide a racking assembly that is easily securable to prevent equipment from falling from the racking assembly. It is further an object of the present invention to provide a racking assembly that is easily placeable onto a vehicle to transport or store equipment.

BRIEF DESCRIPTION OF THE DRAWINGS

FIG. 2 is a side view of the racking assembly in its substantially upright, locked position, FIG. 3 is a side view of the racking assembly in a pivoting position toward the hitch member;

FIG. 4 is a side view of the racking assembly in a pivoting position away from the hitch member;

FIG. 5 shows a further pivoting position away from the hitch member than that shown in FIG. 4;

FIG. 6 shows the racking assembly in its fully extended pivoting position away from the hitch member; and FIG. 7 shows the components of the pivoting mechanism that couples the equipment support assembly to the frame support members.

DETAILED DESCRIPTION OF THE EMBODIMENTS

Figure 1:
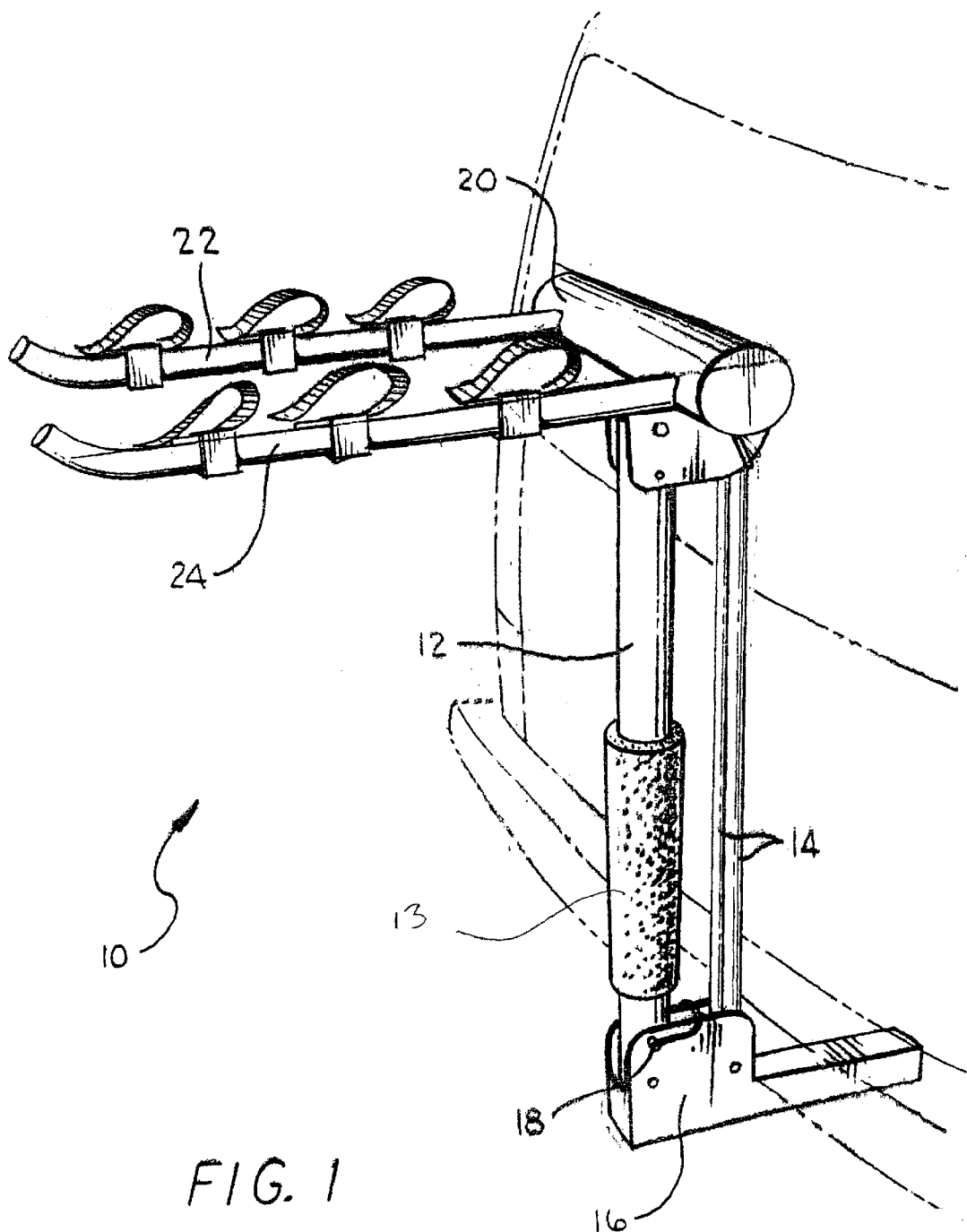
FIG. 1 is a perspective view of a racking assembly in a substantially upright position and mounted on a vehicle.

A racking assembly 10 of the present invention is articulable from a generally upright position, shown in FIG. 1, to a variety of declined positions as shown in FIGS. 2–6. The racking assembly 10 is mountable to a hitch of a vehicle, and when so mounted, enables equipment of various types to be carried thereon. Although the invention is generally described in the context of providing a rack for carrying bicycles, it is to be understood that the racking assembly is equally suited for carrying other types of equipment or articles, among which are included but not limited to surf boards, kayaks, canoes, skis, and luggage.

Both frame support members are generally tubular and constructed from a durable metal such as extruded steel, although any suitable material which is able to withstand the demands of an equipment-carrying, vehicle mounted racking assembly may be used. Such materials should possess sufficient strength characteristics so that various types of equipment, which often might weigh one hundred or more pounds, may be carried by the racking assembly and supported when the racking assembly is moved between upright and declined positions, without over-stressing any of the parts described herein. The frame support members may also be generally rectangular with straight edges instead of curved edges.

FIG. 1 is a view of the racking assembly 10 mounted onto a vehicle. The racking assembly 10 includes a pair of substantially parallel support members which are longitudinally aligned relative to each other. The frame support members include a first frame support member 12 and a second frame support member 14. The frame support members may each include a single member or a plurality of members welded together for additional strength. The first frame support member 12 may also include a padding 13 to provide protection and a convenient place to grasp the first frame support member 12. The second frame support member may also include similar padding. FIG. 1 also shows a hitch member 16 coupled to the frame support members 12 and 14. The distance between the lower ends of the first and second frame support members is slightly larger at the point where the coupling with the hitch member occurs as opposed to the upper ends. A first locking pin 18 is also included, shown in its locked position in FIG. 1, which provides stable support for the racking assembly 10 when mounted onto a vehicle. Removal of this first locking pin 18 causes the frame support members 12 and 14 to pivot relative to the hitch member 16 and therefore the racking assembly 10 is capable of being moved from its locked position.

Also coupled to the frame support members 12 and 14 is an equipment support assembly. The distance between the first and second support members at the point where the upper ends couple to the equipment support assembly is slightly smaller than the distance between the lower ends. The equipment support assembly has a cross member 20 perpendicularly positioned relative to the frame support members 12 and 14. The cross member 20 may have a particular shape, including but not limited to a rectangle or a cylinder, and may be positioned at any angle relative to the first and second frame support members. FIG. 1 also shows a pair of equipment support bars 22 and 24 coupled to the cross member 20. These equipment support bars 22 and 24 may have a plurality of straps capable of holding equipment in place while placed on the equipment support bars 12 and 14. FIG. 1 shows an example of the inclusion of the straps, in which each equipment support bar has three straps.

FIG. 1 shows the racking assembly 10 in a use position in which equipment is capable of being placed on the equipment support bars 22 and 24 and carried on the racking assembly 10. Each of the frame support members 12 and 14 has a locking pin, placed through one end of the frame support member. The first frame support member 12 has the first locking pin 18 placed through the frame support member on the end closest to the hitch member 16. The second frame support member 14 has a second locking pin 26 placed through a housing and close to the equipment support assembly.

FIG. 2 is a side view of the racking assembly 10 in a locked, substantially upright position. Shown in FIG. 2 are the first and second frame support members 12 and 14, the hitch member 16 and the equipment support assembly. The second frame support member 14 is curved at an upper end towards the first frame support member 12. This configuration allows a person, when using the racking assembly 10 in its unlocked position, to place an article onto the equipment support assembly such that when weight is applied to the equipment support assembly the entire racking assembly 10 is forced to move away from the person and towards a vehicle, if the racking assembly is mounted onto a vehicle at that time. Therefore, the positioning and configuration of the first and second support members 12 and 14 prevents the person from being injured when placing articles onto the racking assembly. The curved nature of the second frame support member relative to the first frame support member causes the equipment support assembly and the frame support members to collapse away from the person and stop when it hits the vehicle.

FIG. 3 shows the movement of the racking assembly 10 when an article is placed onto the equipment support assembly. The curved nature of the upper end of the second frame support member 14, and the resultant spacing difference between the first and second frame support members at their respective upper ends and lower ends, distributes the force applied to the equipment support bars and causes the entire racking assembly to move away from the person standing in front of the equipment support bars. The force applied to the equipment support bars is distributed such that the pivot point lies between the longitudinal axis of the second frame support member 14 and pivot axis of the first frame support member 12. The pivot point (i.e. second locking pin) of the second frame support member 14 therefore serves as the point where the racking assembly moves when an article is placed on the equipment support assembly. Also referring to FIG. 3, note that the first locking pin 18 has been removed from the hitch member 16 and from the first frame support member to which it is coupled. This allows for the pivoting of the first and second frame support members relative to the hitch member.

FIGS. 4 and 5 show movement of the racking assembly 10 in the opposite direction from that shown in FIG. 3. In FIGS. 4 and 5 the hitch member 16 of the racking assembly 10 is placed onto a hitch at the rear of a vehicle. Because of the curved nature of the second frame support member 14, placement of an article onto the equipment support assembly causes the racking assembly 10 to move in the opposite direction than that shown in FIGS. 4 and 5. Therefore in order to force the racking assembly 10 to move in the direction shown in FIGS. 4 and 5, the equipment support assembly must be pulled forward away from the vehicle and towards the person (with the person standing in front of the equipment support bars). FIGS. 4 and 5 show examples of the directional movement in which the racking assembly is capable of moving. Note also in FIGS. 4 and 5 that the first locking pins 18 have been removed from the hitch member 16, allowing the pivoting of the first and second frame support members 12 and 14 relative to the hitch member 16 and the equipment support assembly.

FIG. 6 shows further movement of the racking assembly 10 in the same direction as that shown in FIGS. 4 and 5. FIG. 6 is intended to show the furthest possible movement of the racking assembly in the direction shown. Therefore, as above, as the first locking pin 18 is removed from the hitch member 16 and the equipment support assembly is pulled forward, the first and second frame support members 12 and 14 pivot relative to the hitch member 16 and collapse the racking assembly away from the vehicle.

FIG. 7 is a close-up view of the internal connection between the equipment support assembly and the first and second frame support members 12 and 14 and the housing encompassing the internal connection. The equipment support assembly includes an upper pivoting mechanism. The second locking pin 26 is placed through the second frame support member 14, and an upper locking bolt 28 and its corresponding upper locking washer 30 secure the first frame support member 12 to the equipment support assembly. An equipment support housing piece 32 is also shown in FIG. 7. The curved upper end of the second frame support member 14 is pivotally held within the housing piece 32 by the second locking pin 26. The bolt 28 passes through the housing piece 32 and through the first frame support member 12 to fixedly couple the first frame support member 12 to the housing piece 32 with the washer 30. A latch piece 34 is also included to secure the second locking pin 26 to the housing piece 32 and the second frame support member 14.

In the locked position, the racking assembly, and specifically the equipment support assembly, cannot pivot and therefore the equipment support assembly cannot move relative to the first and second frame support members. However, once the second locking pin 26 has been removed, the equipment support assembly can rotate relative to the first and second frame support members.

I claim:

1. A racking assembly comprising:
   a hitch mount;
   an equipment support assembly having at least one equipment support bar; and
   first and second substantially symmetrically opposed, longitudinally aligned support members, the first and second support members each having a lower end pivotally coupled to the hitch mount and an upper end pivotally coupled to the equipment support assembly, the upper end of said second support member being slightly curved toward the upper end of the first support member so that the spacing between the first and second support members is smaller at the upper ends than at the lower ends.

2. The racking assembly of claim 1, wherein the curved upper end of the second frame support member allows the racking assembly to collapse away from a user as equipment is placed on the racking assembly.

3. The racking assembly of claim 1, further comprising a removable locking pin coupling the curved upper end of the second support member to the equipment support assembly.

4. The racking assembly of claim 1, further comprising a bolt assembly coupling the upper end of the first support member to the equipment support assembly.

5. The racking assembly of claim 1, further comprising a housing, the housing coupling the at least one equipment support bar, the upper ends of the first and second support members, the bolt assembly, and the removable locking pin together.

6. The racking assembly of claim 1, further comprising a hitch assembly coupling the hitch mount to the lower ends of the first and second support members.

7. The racking assembly of claim 1, further comprising an additional removable locking pin coupling the lower end of the first support member to the hitch mount, the additional removable locking pin being removable to allow the lower end of the first support member to pivot relative to the hitch mount.

8. The racking assembly of claim 1, further comprising an additional bolt assembly coupling the lower end of the second support member to the hitch mount.

9. The racking assembly of claim 1, further comprising a plurality of securing straps coupled to the at least one equipment support bar.

10. The racking assembly of claim 1, wherein the equipment support assembly includes a plurality of equipment support bars, each of said equipment support bars having a plurality of securing straps coupled thereto, and a cross member positioned substantially perpendicular to said plurality of equipment support bars.

11. A racking assembly comprising:
    a hitch mount;
    a first support member having a lower end pivotally coupled to the hitch mount and an upper end pivotally coupled to a housing; and
    a second support member oppositely oriented relative to said first support member, the second support member having a lower end pivotally coupled to the hitch mount and an upper end curved toward the upper end of the first support member, the curved upper end pivotally coupled to the housing.

12. The racking assembly of claim 11, wherein the curved upper end of the second frame support member allows the racking assembly to collapse away from a user as equipment is placed on the racking assembly.

13. The racking assembly of claim 11, further comprising a locking pin coupling the curved upper end of the second frame support member to the housing.

14. The racking assembly of claim 11, further comprising a bolt assembly, the bolt assembly coupling the upper end of the first frame support member to the housing.

15. The racking assembly of claim 11, further comprising a hitch assembly coupling the hitch mount to the lower ends of the first and second support members.

16. The racking assembly of claim 11, further comprising an additional removable locking pin coupling the lower end of the first support member to the hitch mount, the additional removable locking pin being removable to allow the lower end of the first support member to pivot relative to the hitch mount.

17. The racking assembly of claim 11, further comprising an equipment support assembly coupled to the housing and including a plurality of equipment support bars, each of said equipment support bars having a plurality of securing straps coupled thereto, and a cross member positioned substantially perpendicular to said plurality of equipment support bars.

18. A method of configuring a racking assembly for securely transporting recreational equipment, comprising:
    providing a racking assembly having a pair of oppositely oriented, longitudinally aligned support members including a first support member and a second support member, each support member having an upper end and a lower end, the upper end of the second support member being curved toward the upper end of the first support member;

coupling the upper ends of said first and second support members to an equipment support assembly and the lower ends of the first and second support members to a hitch mount assembly;

securing the movement of the upper ends of the first and second support members with an upper bolt assembly and an upper removable locking pin, the upper bolt assembly fixedly coupling the upper end of the first support assembly to the equipment support assembly, and the upper removable locking pin removably coupling the curved upper end of the second frame support member to the equipment support assembly; and securing the movement of the lower ends of the first and second support members with a lower bolt assembly and a lower removable locking pin, the lower bolt assembly fixedly coupling the lower end of the second support assembly to the hitch assembly, and the lower removable locking pin removably coupling the lower end of the first frame support member to the hitch assembly.

19. The method of claim 18, wherein the curved upper end of the second frame support member allows the racking assembly to collapse away from a user as equipment is placed on the racking assembly.

20. The method of claim 18, further comprising providing at least one equipment support bar coupled to the equipment support assembly, the at least one equipment support bar having a plurality of straps for securing recreational equipment to the at least one equipment support bar.

21. The method of claim 20, further comprising providing a housing for coupling the at least one equipment support bar, the upper ends of the first and second support members, the upper bolt assembly, and the upper removable locking pin together.

22. The method of claim 18, further comprising mounting the hitch assembly onto a hitch mount of vehicle for securely transporting the recreational equipment.

23. The method of claim 18, further comprising providing a plurality of equipment support bars, each of said equipment support bars having a plurality of securing straps coupled thereto, and a cross member positioned substantially perpendicular to said plurality of equipment support bars.

* * * * *